United States Patent
Allam et al.

(10) Patent No.: US 9,523,312 B2
(45) Date of Patent: Dec. 20, 2016

(54) INTEGRATED LNG GASIFICATION AND POWER PRODUCTION CYCLE

(71) Applicant: 8 RIVERS CAPITAL, LLC, Durham, NC (US)

(72) Inventors: Rodney John Allam, Wiltshire (GB); Jeremy Eron Fetvedt, Raleigh, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 431 days.

(21) Appl. No.: 13/666,522

(22) Filed: Nov. 1, 2012

(65) Prior Publication Data

US 2013/0104525 A1 May 2, 2013

Related U.S. Application Data

(60) Provisional application No. 61/554,880, filed on Nov. 2, 2011, provisional application No. 61/555,096, filed
(Continued)

(51) Int. Cl.
*F02C 3/20* (2006.01)
*F02C 3/28* (2006.01)
(Continued)

(52) U.S. Cl.
CPC . *F02C 3/34* (2013.01); *F02C 1/08* (2013.01); *F02C 7/143* (2013.01); *F17C 9/04* (2013.01);
(Continued)

(58) Field of Classification Search
CPC ............... F02C 3/34; F02C 1/08; F02C 3/20; F02C 3/24; F01K 25/103
(Continued)

(56) References Cited

U.S. PATENT DOCUMENTS 3,376,706 A   4/1968  Angelino
3,503,208 A   3/1970  Schmidt
(Continued)

FOREIGN PATENT DOCUMENTS

DE  43 03 174        8/1994
DE  19952884 A1 *    5/2001  ............... F02C 3/34
(Continued)

OTHER PUBLICATIONS

English-language translation of DE19952884A1.*
(Continued)

*Primary Examiner* — Gerald L Sung
*Assistant Examiner* — Scott Walthour
(74) *Attorney, Agent, or Firm* — Womble Carlyle Sandridge & Rice, LLP

(57) ABSTRACT

The present disclosure provides an integrated power generating system and method and liquefied natural gas (LNG) vaporization system and method. More particularly, heat from a $CO_2$ containing stream from the power generating system and method can be used to heat the LNG for re-gasification as gaseous $CO_2$ from $CO_2$ containing stream is liquefied. The liquefied $CO_2$ can be captured and/or recycled back to a combustor in the power generating system and method.

22 Claims, 3 Drawing Sheets

Related U.S. Application Data on Nov. 3, 2011, provisional application No. 61/597,717, filed on Feb. 11, 2012.

(51) Int. Cl.
| | |
|---|---|
| *F02C 3/34* | (2006.01) |
| *F02C 7/141* | (2006.01) |
| *F02G 1/055* | (2006.01) |
| *F02G 1/057* | (2006.01) |
| *F02C 1/08* | (2006.01) |
| *F02C 7/143* | (2006.01) |
| *F17C 9/04* | (2006.01) |
| *F25J 3/04* | (2006.01) |
| *F01K 25/10* | (2006.01) |

(52) U.S. Cl.
CPC ......... *F25J 3/04018* (2013.01); *F25J 3/04024* (2013.01); *F25J 3/04127* (2013.01); *F25J 3/04157* (2013.01); *F25J 3/04533* (2013.01); *F25J 3/04618* (2013.01); *F01K 25/103* (2013.01); *F05D 2260/207* (2013.01); *F05D 2260/213* (2013.01); *F05D 2260/61* (2013.01); *F17C 2201/0109* (2013.01); *F17C 2205/0326* (2013.01); *F17C 2205/0341* (2013.01); *F17C 2221/033* (2013.01); *F17C 2223/0161* (2013.01); *F17C 2223/035* (2013.01); *F17C 2227/0135* (2013.01); *F17C 2227/0157* (2013.01); *F17C 2227/0306* (2013.01); *F17C 2227/0309* (2013.01); *F17C 2227/0323* (2013.01); *F17C 2227/0393* (2013.01); *F17C 2265/037* (2013.01); *F17C 2265/05* (2013.01); *F17C 2265/07* (2013.01); *F25J 2210/62* (2013.01); *F25J 2210/80* (2013.01); *F25J 2230/06* (2013.01); *F25J 2230/20* (2013.01); *F25J 2270/904* (2013.01); *Y02E 20/16* (2013.01); *Y02E 20/18* (2013.01)

(58) Field of Classification Search
USPC ... 60/736, 730, 39.5, 39.511, 39.52, 39.461; 165/108
See application file for complete search history.

(56) References Cited

U.S. PATENT DOCUMENTS

| | | | |
|---|---|---|---|
| 3,736,745 A | 6/1973 | Karig | |
| 3,837,788 A | 9/1974 | Craig et al. | |
| 3,868,817 A | 3/1975 | Marion et al. | |
| 3,971,211 A | 7/1976 | Wethe et al. | |
| 3,976,443 A | 8/1976 | Paull et al. | |
| 4,036,028 A * | 7/1977 | Mandrin | 62/50.3 |
| 4,154,581 A | 5/1979 | Nack et al. | |
| 4,191,500 A | 3/1980 | Oberg et al. | |
| 4,193,259 A | 3/1980 | Muenger et al. | |
| 4,206,610 A | 6/1980 | Santhanam | |
| 4,231,226 A * | 11/1980 | Griepentrog | 60/648 |
| 4,461,154 A | 7/1984 | Allam | |
| 4,498,289 A | 2/1985 | Osgerby | |
| 4,522,628 A | 6/1985 | Savins | |
| 4,602,483 A | 7/1986 | Wilks et al. | |
| 4,702,747 A | 10/1987 | Meyer et al. | |
| 4,721,420 A | 1/1988 | Santhanam et al. | |
| 4,765,143 A | 8/1988 | Crawford et al. | |
| 4,765,781 A | 8/1988 | Wilks et al. | |
| 4,839,030 A | 6/1989 | Comolli et al. | |
| 4,852,996 A | 8/1989 | Knop et al. | |
| 4,881,366 A | 11/1989 | Nurse | |
| 4,942,734 A * | 7/1990 | Markbreiter et al. | 60/783 |
| 4,957,515 A | 9/1990 | Hegarty | |
| 4,995,234 A * | 2/1991 | Kooy et al. | 60/648 |
| 4,999,992 A | 3/1991 | Nurse | |
| 4,999,995 A | 3/1991 | Nurse | |
| 5,175,995 A | 1/1993 | Pak et al. | |
| 5,247,791 A | 9/1993 | Pak et al. | |
| 5,265,410 A | 11/1993 | Hisatome | |
| 5,353,721 A | 10/1994 | Mansour et al. | |
| 5,467,722 A * | 11/1995 | Meratla | B01D 53/002 110/216 |
| 5,520,894 A | 5/1996 | Heesink et al. | |
| 5,590,519 A | 1/1997 | Almlöf et al. | |
| 5,595,059 A | 1/1997 | Huber et al. | |
| 5,692,890 A | 12/1997 | Graville | |
| 5,709,077 A | 1/1998 | Beichel | |
| 5,715,673 A | 2/1998 | Beichel | |
| 5,724,805 A * | 3/1998 | Golomb et al. | 60/783 |
| 5,802,840 A | 9/1998 | Wolf | |
| 5,906,806 A | 5/1999 | Clark | |
| 5,937,652 A | 8/1999 | Abdelmalek | |
| 6,024,029 A | 2/2000 | Clark | |
| 6,117,916 A * | 9/2000 | Allam et al. | 518/702 |
| 6,148,602 A | 11/2000 | Demetri | |
| 6,170,264 B1 | 1/2001 | Viteri et al. | |
| 6,196,000 B1 | 3/2001 | Fassbender | |
| 6,199,364 B1 | 3/2001 | Kendall et al. | |
| 6,202,574 B1 | 3/2001 | Liljedahl et al. | |
| 6,209,307 B1 | 4/2001 | Hartman | |
| 6,260,348 B1 | 7/2001 | Sugishita et al. | |
| 6,263,661 B1 | 7/2001 | Van der Burgt et al. | |
| 6,269,624 B1 | 8/2001 | Frutschi et al. | |
| 6,289,666 B1 | 9/2001 | Ginter | |
| 6,298,664 B1 | 10/2001 | Åsen et al. | |
| 6,333,015 B1 | 12/2001 | Lewis | |
| 6,360,561 B2 | 3/2002 | Allam et al. | |
| 6,389,814 B2 | 5/2002 | Viteri et al. | |
| 6,430,916 B2 | 8/2002 | Sugishita et al. | |
| 6,532,745 B1 | 3/2003 | Neary | |
| 6,536,205 B2 | 3/2003 | Sugishita et al. | |
| 6,543,214 B2 | 4/2003 | Sasaki et al. | |
| 6,550,234 B2 | 4/2003 | Guillard | |
| 6,598,398 B2 | 7/2003 | Viteri et al. | |
| 6,612,113 B2 | 9/2003 | Guillard | |
| 6,622,470 B2 | 9/2003 | Viteri et al. | |
| 6,629,414 B2 | 10/2003 | Fischer | |
| 6,637,183 B2 | 10/2003 | Viteri et al. | |
| 6,684,643 B2 * | 2/2004 | Frutschi | 60/772 |
| 6,764,530 B2 | 7/2004 | Iijima | |
| 6,775,987 B2 | 8/2004 | Sprouse et al. | |
| 6,802,178 B2 | 10/2004 | Sprouse et al. | |
| 6,820,689 B2 | 11/2004 | Sarada | |
| 6,824,710 B2 | 11/2004 | Viteri et al. | |
| 6,871,502 B2 | 3/2005 | Marin et al. | |
| 6,877,319 B2 | 4/2005 | Linder et al. | |
| 6,877,322 B2 | 4/2005 | Fan | |
| 6,898,936 B1 | 5/2005 | Ochs et al. | |
| 6,910,335 B2 | 6/2005 | Viteri et al. | |
| 6,918,253 B2 | 7/2005 | Fassbender | |
| 6,945,029 B2 * | 9/2005 | Viteri | 60/39.17 |
| 6,945,052 B2 | 9/2005 | Frutschi et al. | |
| 6,993,912 B2 | 2/2006 | Fischer | |
| 7,007,474 B1 | 3/2006 | Ochs et al. | |
| 7,007,486 B2 | 3/2006 | Sprouse et al. | |
| 7,021,063 B2 | 4/2006 | Viteri | |
| 7,022,168 B2 | 4/2006 | Schimkat et al. | |
| 7,043,920 B2 | 5/2006 | Viteri et al. | |
| 7,074,033 B2 | 7/2006 | Neary | |
| 7,089,743 B2 | 8/2006 | Frutschi et al. | |
| 7,111,463 B2 | 9/2006 | Sprouse et al. | |
| 7,124,589 B2 | 10/2006 | Neary | |
| 7,147,461 B2 | 12/2006 | Neary | |
| 7,191,587 B2 | 3/2007 | Marin et al. | |
| 7,192,569 B2 | 3/2007 | Stewart | |
| 7,281,590 B2 | 10/2007 | Van de Waal | |
| 7,284,362 B2 | 10/2007 | Marin et al. | |
| 7,299,637 B2 | 11/2007 | Becker | |
| 7,303,597 B2 | 12/2007 | Sprouse et al. | |
| 7,328,581 B2 | 2/2008 | Christensen et al. | |
| 7,334,631 B2 | 2/2008 | Kato et al. | |
| 7,360,639 B2 | 4/2008 | Sprouse et al. | |
| 7,363,764 B2 | 4/2008 | Griffin et al. | |
| 7,377,111 B2 | 5/2008 | Agnew | |

(56) References Cited

U.S. PATENT DOCUMENTS

| | | | |
|---|---|---|---|
| 7,387,197 B2 | 6/2008 | Sprouse et al. | |
| 7,402,188 B2* | 7/2008 | Sprouse | 48/77 |
| 7,469,544 B2 | 12/2008 | Farhangi | |
| 7,469,781 B2 | 12/2008 | Chataing et al. | |
| 7,516,607 B2 | 4/2009 | Farhangi et al. | |
| 7,516,609 B2 | 4/2009 | Agnew | |
| 7,547,419 B2 | 6/2009 | Sprouse et al. | |
| 7,547,423 B2 | 6/2009 | Sprouse et al. | |
| 7,553,463 B2 | 6/2009 | Zauderer | |
| 7,615,198 B2 | 11/2009 | Sprouse et al. | |
| 7,717,046 B2 | 5/2010 | Sprouse et al. | |
| 7,722,690 B2 | 5/2010 | Shires et al. | |
| 7,731,783 B2 | 6/2010 | Sprouse et al. | |
| 7,739,874 B2 | 6/2010 | Nigro | |
| 7,740,671 B2 | 6/2010 | Yows et al. | |
| 7,740,672 B2* | 6/2010 | Sprouse | 48/77 |
| 7,814,975 B2 | 10/2010 | Hagen et al. | |
| 7,826,054 B2 | 11/2010 | Zillmer et al. | |
| 7,827,797 B2 | 11/2010 | Pronske et al. | |
| 7,874,140 B2 | 1/2011 | Fan et al. | |
| 7,882,692 B2 | 2/2011 | Pronske et al. | |
| 7,927,574 B2 | 4/2011 | Stewart | |
| 7,950,243 B2 | 5/2011 | Gurin | |
| 8,043,588 B2 | 10/2011 | Hustad et al. | |
| 8,088,196 B2 | 1/2012 | White et al. | |
| 8,109,095 B2 | 2/2012 | Henriksen et al. | |
| 8,220,248 B2 | 7/2012 | Wijmans et al. | |
| 2002/0134085 A1* | 9/2002 | Frutschi | F01K 25/103 60/772 |
| 2003/0101736 A1* | 6/2003 | Cheng | F25D 3/10 62/86 |
| 2003/0131582 A1 | 7/2003 | Anderson et al. | |
| 2004/0011057 A1 | 1/2004 | Huber | |
| 2004/0123601 A1 | 7/2004 | Fan | |
| 2005/0126156 A1 | 6/2005 | Anderson et al. | |
| 2005/0223712 A1 | 10/2005 | Briesch et al. | |
| 2006/0032228 A1* | 2/2006 | Marin et al. | 60/730 |
| 2006/0242907 A1 | 11/2006 | Sprouse et al. | |
| 2007/0180768 A1 | 8/2007 | Briesch et al. | |
| 2007/0274876 A1 | 11/2007 | Chiu et al. | |
| 2008/0010967 A1 | 1/2008 | Griffin et al. | |
| 2008/0104958 A1 | 5/2008 | Finkenrath et al. | |
| 2008/0115500 A1 | 5/2008 | MacAdam et al. | |
| 2008/0166672 A1 | 7/2008 | Schlote et al. | |
| 2008/0187877 A1 | 8/2008 | Fitzsimmons et al. | |
| 2008/0190214 A1 | 8/2008 | Ubowski et al. | |
| 2008/0302133 A1* | 12/2008 | Saysset | B01D 53/002 62/617 |
| 2008/0309087 A1 | 12/2008 | Evulet et al. | |
| 2009/0025390 A1 | 1/2009 | Christensen et al. | |
| 2009/0061264 A1 | 3/2009 | Agnew | |
| 2009/0130660 A1 | 5/2009 | Faham et al. | |
| 2009/0229271 A1 | 9/2009 | De Ruyck et al. | |
| 2009/0260585 A1 | 10/2009 | Hack et al. | |
| 2009/0277189 A1 | 11/2009 | Eie et al. | |
| 2009/0301054 A1* | 12/2009 | Simpson et al. | |
| 2010/0018218 A1* | 1/2010 | Riley et al. | 60/783 |
| 2010/0024378 A1 | 2/2010 | Ackermann et al. | |
| 2010/0024381 A1 | 2/2010 | Ackermann et al. | |
| 2010/0024433 A1 | 2/2010 | Ackermann et al. | |
| 2010/0031668 A1 | 2/2010 | Kepplinger | |
| 2010/0077752 A1 | 4/2010 | Papile | |
| 2010/0146971 A1* | 6/2010 | Mak | F01K 13/00 60/651 |
| 2010/0167221 A1* | 7/2010 | Canacik | F01N 5/02 431/207 |
| 2011/0036011 A1 | 2/2011 | Sprouse et al. | |
| 2011/0179799 A1* | 7/2011 | Allam et al. | 60/772 |
| 2011/0289941 A1 | 12/2011 | Gonzalez Salazar et al. | |
| 2012/0017639 A1* | 1/2012 | Peterson et al. | 62/611 |

FOREIGN PATENT DOCUMENTS

| | | |
|---|---|---|
| EP | 0 277 777 | 8/1988 |
| EP | 2 390 475 | 11/2011 |
| JP | 2225905 | 9/1990 |
| JP | 2001-132472 | 5/2001 |
| JP | 2001-41007 | 2/2004 |
| WO | WO 2007/148984 | 12/2007 |

OTHER PUBLICATIONS

Angelino et al., "Carbon Dioxide Power Cycles Using Liquid Natural Gas as Heat Sink," *Applied Thermal Engineering*, 2009, doi: 10.1016/j.applthermaleng.2009.03.003 , pp. 1-42.

Combs, Jr. "An Investigation of the Supercritical CO2 Cycle (Feher Cycle) for Shipboard Application," 1977, *Submitted in Partial Fulfillment of the Requirements for the Degree of Ocean Engineer and the Degree of Master of Science in Mechanical Engineering at the Massachusetts Institute of Technology* , 148.

Dostal el al., "A Supercritical Carbon Dioxide Cycle for Next Generation Nuclear Reactors," 2004, (*Research Paper*) *Advanced Nuclear Power Technology Program at MIT*, 326 pages.

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission CO2-Based Power Plant" *Energy Convers. Mgmt*, 1997, Suppl. pp. S141-S146, vol. 38.

E.I. Yantovskii et al. , "Computer Exergonomics of Power Plants Without Exhaust Gases," Energy Convers. Mgmt., Publ. 1992, vol. 33, No. 5-8, pp. 405-412.

Wall et al., "A Zero Emission Combustion Power Plant for Enhanced Oil Recovery," *Energy*, 1995, pp. 823-828, vol. 20, No. 8.

http://www.graz-cycle.tugraz.at/pdfs/Bolland_Kvamsdal_Boden_Liege.pdf; Boland, "A Thermodynamic Comparison of the Oxy-Fuel Power Cycles Water-Cycle, Graz-Cycle and Matiant-Cycle," *Norwegian Science and Technology*, Trondheim, Norway.

http://www2.ulg.ac.be/genienuc/pageco2.htm; Université de Liège, Department of Power Generation, "CO2 Researches".

\* cited by examiner

INTEGRATED LNG GASIFICATION AND POWER PRODUCTION CYCLE

CROSS-REFERENCE TO RELATED APPLICATIONS

The present application claims priority to U.S. Provisional Application No. 61/554,880, filed Nov. 2, 2011, U.S. Provisional Application No. 61/555,096, filed Nov. 3, 2011, and U.S. Provisional Application No. 61/597,717, filed Feb. 11, 2012, the disclosures of which are incorporated herein by reference in their entireties.

FIELD OF THE DISCLOSURE

The present disclosure relates to integration of a power production system with a liquefied natural gas re-gasification system. More particularly, the integrated system utilizes heat exchange to cool a recycle stream in the power production system and to heat and gasify an LNG stream.

BACKGROUND

Natural gas (i.e., methane, predominately) is commonly liquefied for ease of storage and/or transport and is re-gasified for end-use, typically in an LNG gasification facility. Generally, re-gasification requires pressurizing the natural gas ("NG") to a required pipeline pressure—e.g., about 1,000 psi (6.9 MPa). After pressurization, the NG typically is still at or near cryogenic temperatures and therefore must be heated to raise the temperature to ambient. This is often carried out with a water bath heated with a submerged combustion burner, which can use part of the ambient temperature NG as fuel. Often, about 1-2% of the LNG at a re-gasification facility must be burned to heat the LNG to ambient temperature after it is pressurized, and this creates significant effects on efficiency, cost, fossil fuel consumption, and $CO_2$ emissions. It would be useful to provide systems and methods for re-gasification that address these matters.

Natural gas, coal, and other carbonaceous fuels are commonly used in power production cycles, such as gas turbine combined cycle systems, supercritical pulverized coal systems, and others. Other power production systems utilizing natural gas, coal, and other carbonaceous fuels as a fuel also have been used or proposed. Power production efficiency, however, is a limiting factor in the integration of new power production technologies. Accordingly, it would be useful to provide systems and methods for power production with improved efficiency.

SUMMARY OF THE DISCLOSURE

The present disclosure provides an integration of systems in a manner that can improve efficiencies and reduce costs in relation to both systems. More particularly, the disclosure provides for the integration of a power production system and cycle with an LNG re-gasification system and method. The disclosure also provides for the integration of a $CO_2$ shipping process with an LNG shipping process.

Systems and methods for power generation using predominately $CO_2$ in a closed combustion cycle are described in U.S. Pat. Pub. No. 2011/0179799, the disclosure of which is incorporated herein by reference in its entirety, and in various embodiments, one or more components or conditions of the power generating systems and methods disclosed therein can be incorporated into the power generating systems and methods of the present disclosure. The combustion cycle can use a high pressure ratio turbine that expands a mixture of combustion products that are formed in the combustion of a fuel in oxygen in the presence of $CO_2$ working fluid stream (which typically is recycled—at least in part—through the closed system). In various embodiments, a $CO_2$ cycle such as described above can be used in power production using NG, coal, or other carbonaceous materials as a fuel source. Hot turbine exhaust is used to partially preheat the recycled $CO_2$ working fluid stream in an economizer heat exchanger. The recycled $CO_2$ working fluid stream also can be heated using a secondary heat source, such as heat derived from the compression energy from an $O_2$ production plant that is used to provide oxygen for combustion. Fuel and combustion-derived impurities (e.g., sulfur compounds, $CO_2$, $H_2O$, ash, Hg, etc.) can be separated for disposal with no atmospheric emissions. The system can produce a high pressure $CO_2$ recycle stream (i.e., that is recycled as the working fluid) and a high pressure $CO_2$ product stream (i.e., excess $CO_2$ that is not recycled into the combustion cycle and that can be captured for uses, such as enhanced oil recovery, or for sequestration). This can be achieved by compressing the cooled turbine exhaust stream from the economizer heat exchanger in a multistage compression system.

The present disclosure provides the ability to integrate an NG, coal, or other carbonaceous materials fueled $CO_2$ cycle power production system with LNG re-gasification such that heat from one or more streams of the $CO_2$ power generation system can be utilized for heating the compressed NG while simultaneously cooling one or more process streams from the $CO_2$ power cycle. In some embodiments, cooling from the compressed NG stream in the LNG re-gasification system can be sufficient so as to allow for elimination of one or more compression components from the $CO_2$ cycle and rather liquefy a gaseous, recycle stream against the cryogenic LNG. Integration of the power generation system with the LNG gasification system can increase the efficiency of the $CO_2$ cycle power production process to greater than 60%.

In further embodiments, integration of an LNG heating process with a $CO_2$ compression step in a closed cycle power generation system and process can be useful to reduce or eliminate the fuel consumption required for heating LNG in a conventional re-gasification process. Further, liquefying a $CO_2$ rich turbine exhaust stream leaving the cool end of an economizer heat exchanger following separation of liquid water from the turbine exhaust stream ca be carried out simultaneously with heating of a first LNG stream to a desired temperature, such as greater than about 32° C. (0° F.). Thereafter, the liquid $CO_2$ at high density can be pumped to a sufficiently high pressure to be recycled back into a combustion process as the $CO_2$ working fluid, and this can be achieved with a very significant power savings compared to a normal gas compression procedure. In further embodiments, the natural gas from the heat exchanger used to liquefy the $CO_2$ can be heated to near ambient temperature so that it can be delivered to a natural gas pipeline. For example, this can be accomplished by cooling a stream of cooling water to a desired temperature, such as about 0° C. to about 10° C. This cold water then can be used in a closed cycle system to cool air being compressed before delivery to a cryogenic oxygen plant in order to reduce air compressor power consumption. Still further, the liquefied $CO_2$ stream can be cooled to a temperature that is within about 10° C. of the $CO_2$ freezing temperature, and this can be useful to minimize the liquid $CO_2$ pump power while maximizing liquid $CO_2$ density. Beneficially, a portion of the heated natural gas leaving the $CO_2$ liquefaction heat exchanger can be recycled and mixed with the cold, high pressure LNG leaving the main LNG pumps to provide a natural gas fluid at a temperature within about 10° C. above the $CO_2$ freezing temperature. This mixed natural gas fluid can be used as the cooling medium in the $CO_2$ liquefying heat exchanger. In other embodiments, a parallel natural gas fired LNG heater can be provided at the necessary operating temperature as a standby system with controls allowing instant switchover from the main power generation system to the LNG heater in the event the power generation system must be offline. Similarly, at least one additional primary LNG pump discharging at the required pipeline pressure can be provided so that if the on-line LNG pump supplying the power generation system goes offline, the second pump can come on-line and take over the LNG supply requirements. Further, a second LNG pump discharging at the required high pressure can be provided and can be used to provide a second natural gas stream for use as fuel for the combustor in the power generation system. The refrigeration from this stream can be recovered by heating it in the $CO_2$ liquefying heat exchanger in a parallel circuit to the first LNG circuit.

In certain embodiments, the present disclosure can provide methods of generating power. For example, a method of generating power can comprise combusting a carbonaceous fuel in a combustor in the presence of oxygen and $CO_2$ to form a $CO_2$ recycle stream and to produce a combined combustion product stream. The method further can comprise passing the combined combustion product stream through a turbine to generate power and form a turbine exhaust stream comprising supercritical $CO_2$, passing the turbine exhaust stream comprising supercritical $CO_2$ through a first heat exchanger to convert the supercritical $CO_2$ to a stream comprising gaseous $CO_2$, and passing the gaseous $CO_2$ stream through a second heat exchanger to form a liquid $CO_2$ stream. The step of passing the gaseous $CO_2$ stream through the second heat exchanger further can comprise passing a liquefied natural gas (LNG) stream through the second heat exchanger and thus forming a gaseous natural gas (NG) stream. The method further can comprising pressurizing the liquid $CO_2$ stream to form a recycle stream comprising supercritical $CO_2$ and passing the recycle $CO_2$ stream to the combustor. If desired, a fraction of the LNG can be utilized as fuel for the combustor, and a NG product stream can be provided at temperatures and pressures suitable for input to a natural gas distribution pipeline.

In further embodiments, a method of generating power can comprise the following steps: combusting a carbonaceous fuel in a combustor in the presence of oxygen and $CO_2$ to form a $CO_2$ recycle stream and to produce a combined combustion product stream; passing the combined combustion product stream through a turbine to generate power and form a turbine exhaust stream comprising $CO_2$; passing the turbine exhaust stream comprising $CO_2$ through a first heat exchanger so as to transfer heat from the turbine exhaust stream to the $CO_2$ recycle stream and form a cooled turbine exhaust stream; passing a liquefied natural gas (LNG) stream and $CO_2$ from the cooled turbine exhaust stream through a second heat exchanger so as to cool and liquefy the $CO_2$ and so as to heat and vaporize the LNG to form a liquefied $CO_2$ stream and a gaseous natural gas (NG) stream; pressurizing the liquefied $CO_2$ stream to form the $CO_2$ recycle stream; and passing the recycle $CO_2$ stream to the combustor. The first heat exchanger can be characterized as a combustion product heat exchanger, and the second heat exchanger can be characterized as a $CO_2$ liquefier heat exchanger.

The combustor can be any combustor suitable for combustion at the required temperature and pressure. A $CO_2$ recycle stream passed to the combustor can be provided at a pressure of about 150 bar (15 MPa) or greater, about 200 bar (20 MPa) or greater, about 250 bar (25 MPa) or greater, or about 300 bar (30 MPa) or greater. In other embodiments, the pressure can be about 150 bar (15 MPa) to about 400 bar (40 MPa), about 200 bar (20 MPa) to about 380 bar (38 MPa), or about 250 bar (25 MPa) to about 350 bar (35 MPa). Combustion in the combustor can be carried out at a temperature, for example, of about 500° C. or greater, about 600° C. or greater, or about 700° C. or greater. In other embodiments, combustion can be carried out at a temperature of about 500° C. to about 1600° C., about 550° C. to about 1200° C., or about 600° C. to about 1000° C. In other embodiments, even further temperature ranges can be used, as otherwise described herein.

The power generation method can be characterized by the pressure ratio across the turbine. Specifically, the ratio of the pressure of the combined combustion product stream (entering the turbine) to the pressure of the turbine exhaust stream comprising $CO_2$ (exiting the turbine) can be 12 or less, about 10 or less, or about 8 or less. In other embodiments, the pressure ratio can be about 4 to about 12, about 5 to about 10, or about 6 to about 10.

The combustion product heat exchanger through which the combined combustion product stream is directly passed can be a multi-stage heat exchanger or a series to two or more, preferably three, serial heat exchangers. In such series, the first serial heat exchanger (passing from hot end to cold end) can transfer heat over a high, broad temperature range—e.g., from the turbine outlet temperature to the range of about 150° C. to about 200° C. The second serial heat exchanger can transfer heat over a middle, narrower temperature range—e.g., from the exit temperature of the first serial heat exchanger to the range of about 80° C. to about 140° C. The third serial heat exchanger can transfer heat over a low temperature range—e.g., the range of about 20° C. to about 75° C. Such ranges likewise can apply to fluids passed from the cold end to the hot end of each heat exchanger in the series. Such series can be beneficial in that added heating of the $CO_2$ recycle stream passing from the cold end of the serial heat exchangers to the hot end of the heat exchangers can be input at a defined point. For example, the stream exiting the third serial heat exchanger and entering the second serial heat exchanger can be split, and one fraction can enter the second serial heat exchanger while the other fraction is heated from an external source, such as the heat of compression captured from an air separation plant. The higher heated fraction can then be joined with the stream exiting the second serial heat exchanger and entering the first serial heat exchanger. Such added heat can be beneficial to bring the temperature of the $CO_2$ recycle stream to within a preferable threshold relative to the temperature of the turbine exhaust stream. Specifically, the $CO_2$ recycle stream can be heated to within 50° C. or less, 40° C. or less, or 30° C. or less of the temperature of the turbine exhaust stream.

The power generation method further can be characterized by the nature of the LNG that is processed in parallel to the combustion cycle. For example, stored LNG often can be at a pressure that is less than about 10 bar (1 MPa), less than about 5 bar (0.5 MPa), or less than about 1 bar (0.1 MPa). Thus, it can be beneficial for the LNG passed into the second heat exchanger can be provided at an increased pressure. Specifically, the LNG can be pumped to a pressure of about 30 bar (3 MPa) or greater, about 40 bar (4 MPa) or greater, about 50 bar (5 MPa) or greater, or about 60 bar (6 MPa) or greater. In other embodiments, the LNG can be pumped to a pressure of about 50 bar (5 MPa) to about 90 bar (9 MPa), about 55 bar (5.5 MPa) to about 85 bar (8.5 MPa) or about 60 bat (6 MPa) to about 80 bar (8 MPa).

LNG also typically can be stored at a temperature that is below the freezing point of $CO_2$ at working pressures discussed herein. Thus, it can be useful to increase the temperature of the LNG prior to passing the LNG through the second heat exchanger that removes heat from the $CO_2$ stream and liquefies the $CO_2$ stream. In certain embodiments, this can be achieved through utilization of a portion of the heated, gaseous NG stream that is formed in (and exits) the second heat exchanger (the $CO_2$ liquefier heat exchanger). Specifically, a fraction of the gaseous NG stream formed by the second heat exchanger can be withdrawn and input to the LNG stream that is passed into the second heat exchanger, preferably immediately prior to passage of the LNG stream into the second heat exchanger. The fraction of the gaseous NG stream input to the LNG stream can be an amount that is sufficient to raise the temperature of the LNG stream to a temperature that is above the $CO_2$ solidification temperature. Preferably, it is sufficient to raise the temperature of the LNG stream to a temperature that also is within about 25° C., within about 20° C., within about 15° C., or within about 10° C. of the $CO_2$ solidification temperature.

Heat exchange in the second heat exchanger also can be characterized in relation to the temperature to which the $CO_2$ stream is cooled. Specifically, the $CO_2$ from the cooled turbine exhaust stream can be cooled (which can be referred to as being sub-cooled) in the second heat exchanger to a temperature that is above the $CO_2$ solidification temperature and is within about 40° C., within about 30° C., or within about 20° C. of the $CO_2$ solidification temperature.

The liquefied $CO_2$ stream beneficially can be pressurized to a pressure suitable for injection to the combustor as the $CO_2$ recycle stream. Specifically, the step of pressurizing the $CO_2$ recycle stream can comprise passing the $CO_2$ recycle stream through a liquid pump. In some embodiments, the power generating turbine and the liquid pump can be arranged such that the power generating turbine produces shaft power that can be used to drive the liquid pump. The liquefied and pressurized $CO_2$ stream exiting the liquid pump can be heated. In particular, the heating can comprise passing the pressurized $CO_2$ recycle stream back through the second heat exchanger. In some embodiments, the $CO_2$ recycle stream can be heated to a temperature of about −20° C. or greater, about −10° C. or greater, about 0° C. or greater, or about 10° C. or greater.

In addition to the first and second heat exchangers, one or more further heat exchangers can be utilized to preserve heat exchange potential in one or more components of the power generation system. This heat exchange potential can be applied to a variety of streams in the presently disclosed methods.

For example, in some embodiments, the carbonaceous fuel used in the combustor can comprise NG derived from the LNG stream. Other embodiments of the method can utilize additional or different carbonaceous fuels, including coal, biomass, and the like. In order to provide a NG stream to the combustor, the methods can comprise passing the LNG through a first pump and a second pump to increase the pressure thereof, such as to a pressure already described above. The LNG exiting the second pump can then be heated, such as to a temperature of about 100° C. or greater, about 150° C. or greater, about 200° C. or greater, or about 250° C. or greater. Such heating can be achieved by passing the LNG through the second heat exchanger so as to form a gaseous NG stream. If desired, the gaseous NG stream can be further heated by other heat exchange means.

For example, heating of the gaseous NG stream can comprise utilizing heat of compression from an air separation plant, specifically a cryogenic air separation plant. Such air separation plant can be integrated into the power generation system such that oxygen formed in the air separation plant can be directly input to the combustor in the power generation method. Further means for utilizing heat of compression from an air separation plant are discussed below.

In certain embodiments of the present disclosure, the power generation method can further comprise passing the cooled turbine exhaust stream through a third heat exchanger after passage through the first heat exchanger and prior to passage through the second heat exchanger. The third heat exchanger can be a low temperature heat exchanger, and such passage through the third heat exchanger can be effective to provided intermediate cooling of the turbine exhaust stream. Passage of the turbine exhaust stream through the first heat exchanger significantly cools the turbine exhaust stream through a relatively high temperature range—e.g., from a temperature in the range of about 600° C. to about 800° C. (or a further temperature near a combustion temperature discussed herein) to a temperature in the range of about 50° C. to about 20° C. The thusly cooled turbine exhaust stream then receives intermediate cooling in the third heat exchanger—for example, further cooling the turbine exhaust stream to a temperature of about −10° C. to about 15° C., about −5° C. to about 12° C., or about 0° C. to about 10° C. This intermediate cooling thus can be carried out prior to passage of the turbine exhaust stream through the second heat exchanger, which provides sub-cooling and liquefaction of the $CO_2$ from the turbine exhaust stream. In the third heat exchanger, the turbine exhaust stream can be cooled against a fraction of the gaseous NG stream exiting the second heat exchanger.

After passage through the third heat exchanger and prior to passage through the second heat exchanger, the cooled turbine exhaust stream can be passed through one or both of a liquid water separator and a desiccant drier. With water removed from the turbine exhaust stream, a purified stream of $CO_2$ from the cooled turbine exhaust stream can be thus provided as a dried $CO_2$ stream. If desired (and depending upon the combustion fuel used), one or more further separators and/or filters can be included to remove further contaminants from the turbine exhaust stream. Preferably, the $CO_2$ stream from the turbine exhaust can be input to the second heat exchanger having a $CO_2$ purity of about 95% or greater, about 97% or greater, or about 99% or greater. In some embodiments, the dried $CO_2$ stream can be dried to a dew point of about −30° C. or below, about −40° C. or below, about −50° C. or below, or about −60° C. or below.

In certain embodiments, a portion of the recycle $CO_2$ stream passing to the combustor can be heated utilizing heat of compression from the air separation plant. In particular, heat can be transferred to the portion of the recycle $CO_2$ stream over a temperature range of about 100° C. to about 400° C.

The recycle $CO_2$ stream passing to the combustor in particular can be separated into a first fraction and a second fraction. The first fraction of the recycle $CO_2$ stream passing to the combustor can be input directly to the combustor. The second fraction of the recycle $CO_2$ stream passing to the combustor can be combined with the oxygen to form an oxidant stream that is input to the combustor, the oxidant stream being capable of being provided in a variety of ratios. For example, the oxidant stream can comprise about 20% to about 40% oxygen and about 60% to about 80% $CO_2$ on a molar basis. In other embodiments, the oxidant stream can comprise about 25% to about 35% oxygen and about 65% to about 75% $CO_2$ on a molar basis The power generation methods of the present disclosure can particularly be characterized in relation to the overall efficiency of the power generation. For example, the power generation can be achieved with an overall efficiency on a lower heating value of at least 60%. In other embodiments, the efficiency can be at least 65%.

In further embodiments, the present disclosure can provide a variety of power generating systems. In certain embodiments, a power generating system can comprise the following: a combustor adapted to combust a carbonaceous fuel in the presence of oxygen and a $CO_2$ recycle stream to produce a combined combustion product stream; a power producing turbine in fluid communication with the combustor and adapted to receive the combined combustion product stream and output a turbine exhaust stream comprising $CO_2$; a first heat exchanger in fluid communication with the power producing turbine and the combustor and adapted to transfer heat from the turbine exhaust stream comprising $CO_2$ to the $CO_2$ recycle stream so as to provide a cooled turbine exhaust stream comprising $CO_2$; a second heat exchanger in fluid communication with the first heat exchanger and adapted to liquefy $CO_2$ in the turbine exhaust stream; a recycle compressor adapted to pressurize the liquefied $CO_2$ to a pressure suitable for recycle to the combustor; and a source of liquefied natural gas (LNG) in fluid communication with the second heat exchanger. In further embodiments, the system further can comprise a third heat exchanger positioned between and in fluid communication with the first heat exchanger and the second heat exchanger. The third heat exchanger can include, for example, an inlet in fluid communication with an outlet on the first heat exchanger, an inlet in fluid communication with an outlet on the second heat exchanger, and an outlet in fluid communication with an inlet on the second heat exchanger. A system according to the present disclosure also can comprise one or more water removal devices positioned between the outlet on the third heat exchanger and the inlet on the second heat exchanger.

A power generating system as presently disclosed can be configured such that the power producing turbine is adapted to provide shaft power for a liquid pump. More specifically, the liquid pump can be positioned between and be in fluid communication with the LNG source and the second heat exchanger.

A power generating system as presently disclosed also can comprise an air separation plant. More particularly, the air separation plant can be a cryogenic air separation plant comprising an adiabatic main compressor and a booster compressor. The adiabatic main compressor can include two adiabatic stages.

In further embodiments, a power generating system according to the present disclosure can comprise a combustor in which a carbonaceous or hydrocarbon fuel is combusted with oxygen and mixed with a heated recycle stream comprising $CO_2$ to produce a combined stream that is expanded in a power producing turbine with the turbine exhaust heating the recycle stream in an economizer heat exchanger and with a compressor compressing the cooled turbine exhaust leaving the economizer heat exchanger to the required recycle pressure. Such system in particular can be characterized by one or more of the following.

The recycle compressor can be a liquid pump.

The turbine exhaust flow leaving the economizer heat exchanger can be liquefied in a heat exchanger before entering the recycle liquid pump.

The heat removed from the turbine exhaust stream in the heat exchanger can be transferred to a liquid natural gas stream which can be heated to a temperature defined by a temperature approach to the cooling $CO_2$ liquefaction temperature.

The liquid natural gas stream can be taken from the discharge of a high pressure LNG pump at a pressure consistent with the delivery of heated high pressure natural gas into a transportation pipeline.

Part of the heated natural gas leaving the hot end of the $CO_2$ liquefaction heat exchanger can be recycled and mixed with the pressurized LNG stream from the LNG pump to produce a stream of natural gas at a temperature within 10° C. of and above the $CO_2$ solidification temperature and used to liquefy the $CO_2$ stream in the $CO_2$ liquefier heat exchanger.

The liquefied $CO_2$ stream can be sub-cooled to a temperature within 20° C. of the $CO_2$ solidification temperature.

The pressurized recycle liquid $CO_2$ stream leaving the liquid $CO_2$ pump can be heated in the $CO_2$ liquefier heat exchanger to a temperature above 0° C.

The natural gas fuel for the power system combustor can be taken from the discharge of a high pressure LNG pump and compressed to the required pressure for combustion in a second LNG pump.

The compressed liquid fuel gas for the power system combustor can be heated to a temperature above 200° C. using heat from the cooling, liquefaction and sub-cooling of at least part of the dried power system turbine exhaust plus heat of compression of at least part of the air feed to the cryogenic oxygen plant which supplies oxygen for the combustor.

The cooled turbine exhaust stream leaving the cold end of the economizer heat exchanger can be further cooled to between 0° C. and 10° C. in a heat exchanger against part of the natural gas stream leaving the hot end of the $CO_2$ liquefier heat exchanger.

The cooled turbine exhaust stream at a temperature between 0° C. and 10° C. can be dried to a dew-point below −50° C. by a combination of a liquid water separator and a desiccant drier.

A control system can allow rapid switch of pressurized LNG flow from feed to the integrated LNG and power generating system to a separately heated LNG heater without causing more than a 2% fluctuation in the natural gas pipeline pressure.

A control system can allow rapid switch of pressurized LNG to the power generating system from one supply pump to another if the first pump should fail to supply pressurized LNG without causing more than a 5% drop in the turbine inlet pressure in the power system.

The compressed air used as feed to the air separation plant can transfer heat of compression to part of the high pressure recycle $CO_2$ from the power generating system over a temperature range of 100° C. to 400° C.

The compressed air used as feed to the air separation plant can transfer heat of compression to the product oxygen stream, which is heated to a temperature of up to 300° C.

The compressed air used as feed to the air separation plant can transfer heat to the high pressure power system fuel gas stream, which is heated to a temperature of up to 300° C.

A closed cycle cooling fluid can be used in a further heat exchanger to cool at least part of the air feed to the air separation plant, and at least part of the heat transferred to cool the fluid can be used to heat at least part of the high pressure recycle $CO_2$ leaving the warm end of the $CO_2$ liquefier heat exchanger.

A closed cycle cooling fluid can be used in a further heat exchanger to cool at least part of the air feed to the air separation plant, and at least part of the heat transferred to cool the fluid is used to heat at least part of the high pressure fuel gas for the power system.

The systems and methods of the present disclosure are further beneficial in that excellent efficiency can be achieved simultaneously with carbon capture. Thus, the disclosed systems and methods fill a need for power generation with carbon capture and storage (CCS). Whereas achieving CCS with conventional power generating systems has proven difficult and/or not cost-effective, the presently disclosed methods utilizing closed cycle combustion can achieve high efficiency and meet the needs for CCS, all while doing so in a cost-effective manner.

In other embodiments, the present disclosure provides improvements in the efficiency of producing and transporting LNG, such as through integration of a $CO_2$ shipping system and method with a LNG shipping system and method. The integration of $CO_2$ shipment with LNG shipment processes can lead to an overall improvement in transportation efficiency, LNG production efficiency, transportation energy consumptions, and transportation $CO_2$ emissions. In particular, the equipment utilized for shipping or otherwise transporting LNG from a NG producing area to a NG distribution area can be also be utilized for shipping or otherwise transporting $CO_2$ from a $CO_2$ producing area to a $CO_2$ consuming area. Whereas LNG containers are often shipped empty back to a NG producing area for refilling, $CO_2$ produced in the instantly described power generation system and method can be filled in the LNG containers and shipped back to the NG producing area, where the $CO_2$ can be utilized for a variety of processes, such as enhanced oil or natural gas production, or can be simply sequestered. Thus, in addition to the gains in efficiencies in relation to the integrated power generating system and LNG vaporization system, the incorporation of $CO_2$ shipment from NG consuming areas/$CO_2$ producing areas to NG producing/$CO_2$ consuming areas adds additional efficiencies and economies which can be appreciated by one skilled in the art, and which provided useful economic benefits.

DETAILED DESCRIPTION OF THE DISCLOSURE

Figure 1:
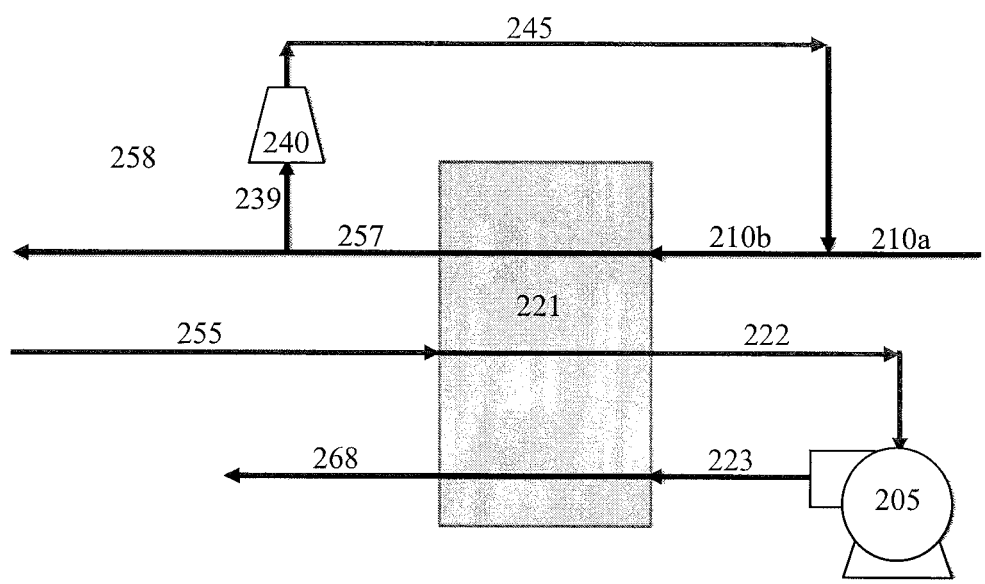
FIG. 1 shows a segment of a power generating system integrated with a segment of a LNG vaporization system according to certain embodiments of the present disclosure and illustrates the heat transfer whereby a $CO_2$ stream is liquefied and a LNG stream is vaporized to form a NG stream.

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

US Patent Publication No. 2011/0179799, as already noted above, describes power production systems and methods wherein a $CO_2$ cycle is utilized. In some embodiments, a $CO_2$ circulating fluid can be provided in a combustor suitable for high temperature and high pressure conditions along with a carbonaceous fuel (such as NG, coal, syngas, biomass, etc.) and an oxidant, such as air or $O_2$. Such systems and methods can comprise a combustor that operates at high temperatures (e.g., about 500° C. or greater, about 750° C. or greater, about 1,000° C. or greater, or about 1,200° C. or greater), and the presence of the circulating fluid can function to moderate the temperature of a fluid stream exiting the combustor so that the fluid stream can be utilized in energy transfer for power production. The nature of the reaction process at high temperatures and pressures, and with high recycle $CO_2$ concentrations, can provide for excellent process efficiency and reaction speeds. The combustion product stream can be expanded across at least one turbine to generate power. The expanded gas stream then can be cooled to remove combustion by-products and/or impurities from the stream, and heat withdrawn from the expanded gas stream can be used to heat the $CO_2$ circulating fluid that is recycled back to the combustor.

In the cooled state, the combustion stream can be processed for removal of water and other contaminants to provide an essentially pure $CO_2$ stream for recycle back through the combustor with the materials for combustion. The purified $CO_2$ stream typically is in a gaseous state, and it is beneficial to subject the stream to the necessary conditions such that the $CO_2$ is a supercritical state. For example, after the combustion stream has been expanded through a turbine for power generation, cooled, and purified to comprise essentially pure $CO_2$ (e.g., at least 95% by mass, at least 97% by mass, or at least 99% by mass $CO_2$), the resultant recycle $CO_2$ stream can be compressed to increase the pressure thereof, such as to about 80 bar (8 MPa). A second compression step can be used to increase the pressure to approximately the pressure in the combustor—e.g., about 200 bar (20 MPa), about 250 bar (25 MPa), or about 300 bar (30 MPa). In between the compression steps, the $CO_2$ stream can be cooled to increase the density of the stream so as to reduce the energy input required to pump the stream to the higher pressure. The finally pressurized recycle $CO_2$ stream can then be further heated and input back into the combustor. Although the above-described power generation system and method provides increased efficiency over conventional power generation systems and methods (and does so while simultaneously capturing the produced carbon), processing the recycle $CO_2$ stream still requires a significant amount of energy to achieve the necessary compression discussed above. The energy input for compression, however, can be significantly reduced through integration of a re-gasification process for liquefied natural gas (LNG). By utilizing cooling capacity from the LNG re-gasification system, it is possible to liquefy the $CO_2$ at a reduced pressure (e.g., about 30 bar) and thereafter increase the pressure of the stream. Thus, the systems and methods of the present disclosure can utilize the refrigeration inherent to the LNG to decrease the energy required for compression in the $CO_2$ cycle and also decrease the energy required for gasification of the LNG.

In various embodiments of the present disclosure, a power generation system can be characterized as illustrated in FIG. 1. As seen therein, a heat exchange relationship (the shaded rectangle) is utilized as the heat source for the LNG in the re-gasification system and as a cooling source of the recycle $CO_2$ stream in the power generation system, which can reduce or even eliminate the need for initial compression. In FIG. 1, an LNG supply 210a is provided at typical temperature—e.g., about −247° F. (−155° C.), and has been pumped to a pressure of about 69 bar (6.9 MPa). The LNG supply (optionally intersected with a supplemental feed discussed below) is passed through a heat exchanger 221, and the resultant NG stream 257 exits at a temperature of about 15° F. (−9.4° C.) and a pressure that is substantially unchanged. The NG stream can be divided into a product NG stream 258 and a supplement NG stream 239. The product NG stream can be input to a pipeline or otherwise transported or used as a fuel source. The supplement NG stream can be routed upstream of the heat exchanger and input to the LNG supply to provide supplemental heating of the LNG supply, if desired. The heated LNG supply 210b then can be the LNG stream input to the heat exchanger. A blower 240 can be utilized to drive the supplement NG stream.

The cooled and purified turbine exhaust stream 255 can be a temperature and pressure, for example, of about 63° F. (17.2° C.) and 30 bar (3 MPa). The cooled and purified exhaust stream can be passed through the heat exchanger 221, and the exiting, sub-cooled recycled $CO_2$ stream 222 at a temperature of about −65° F. (−53° C.) and 30 bar (3 MPa) can be passed through a pump 205. The exiting high pressure recycle $CO_2$ stream 223 can be at a temperature of about −45 (−42° C.) and a pressure of about 305 bar (30.5 MPa). If desired, the high pressure recycle $CO_2$ stream can be again passed through the heat exchanger 221 (or a separate heat exchanger) to increase the temperature thereof—e.g., to about 40° F. (5° C.). This heated recycle $CO_2$ stream then can proceed through the power generating system, as described herein, for recycle back into the combustor of the system.

Figure 2:
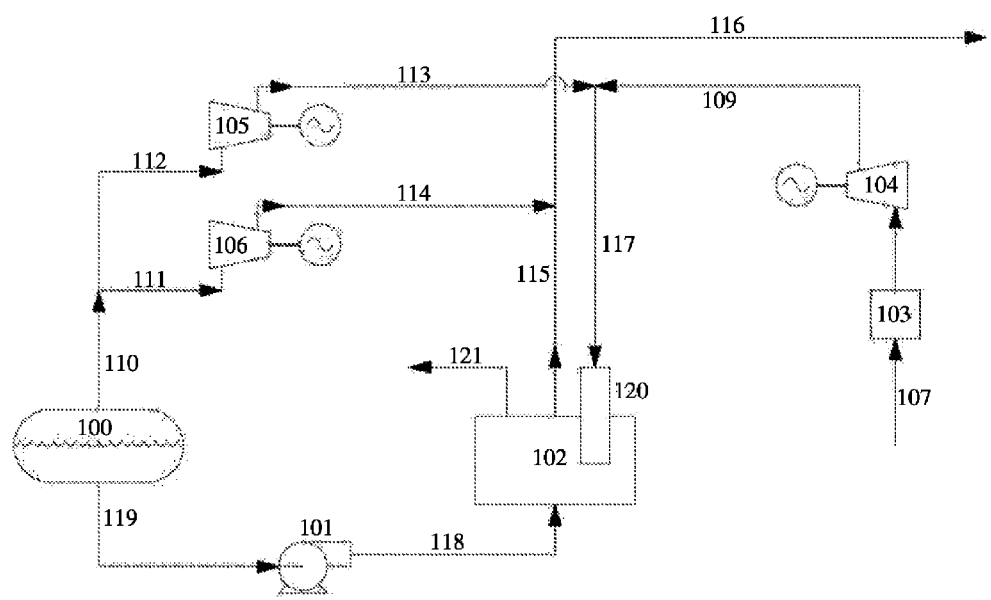
FIG. 2 is a flow diagram illustrating a known system and method for vaporizing LNG to form NG for input to a pipeline.

In further embodiments, one or more elements of a conventional LNG re-gasification system can be combined with a power generation system, such as described herein. An example of a typical system used for converting LNG (e.g., stored in a tank at about 0.05 bar to about 0.1 bar above atmospheric pressure), to pipeline-ready natural gas (e.g., near ambient temperature and up to about 70 bar (7 MPa) pressure) is shown in FIG. 2.

Generally, a conventional LNG re-gasification system utilizes a multistage centrifugal pump to pump the LNG to a high pressure after which it is vaporized in a water bath heat exchanger that is heated by burning natural gas. In the example shown in FIG. 2, LNG is stored in a tank 100. LNG flows out of the base of the tank along LNG supply line 119 and is pressurized in pump 101 to about 70 bar (7 MPa). The pressurized LNG is discharges through line 118 and enters a water bath vaporizer 102, which is maintained at a temperature of about 50° C. to about 90° C. by means of a burner 120 that is fed by a pressurized fuel gas stream 117 comprising a mixture of air provided through air line 109 and natural gas provided through NG burner fuel line 113. The burner 120 has an outlet tube that is submerged up to about 2 meters below the surface of the water in the water bath so that the combustion products must rise through and mix with the water thus heating the water. This arrangement leads to the condensation of much of the water produced by combustion of the natural gas, thus increasing the efficiency of the heating system. The cooled combustion gases are vented to the atmosphere along vent line 121. The natural gas fuel is taken from the LNG tank boil-off line 110 as boil-off stream 112, which is compressed to the required burner pressure in an electrically driven boil-off blower 105. The air through atmospheric air line 107 required for combustion is purified through a filter 103, and is compressed to the burner pressure in the electrically driven burner pressure blower 104. The remaining LNG tank boil-off stream 110 flows through boil-off compressor line 111 and is compressed to about 69 bar (6.9 MPa) in boil-off compressor 106 to give compressed boil-off NG stream 114, which is mixed with the product natural gas steam 115 exiting the vaporizer 102 to produce the total natural gas pipeline flow stream 116 at a pressure of about 69 bar (6.9 MPa) and a temperature of about 15° C. The quantity of natural gas consumed in the burner to convert the LNG to pipeline gas typically is about 1.55% of the total natural gas flow in the pipeline stream 116.

A power generation system such as noted herein in relation to the system described in US patent application 2011/0179799 can be particularly improved though integration of the LNG re-gasification system. Such integrated power generation system can use $CO_2$ as a working fluid in a Brayton cycle power system that operates with an economizer heat exchanger between a high pressure recycle $CO_2$ stream and a low pressure turbine exhaust stream. In such system, combustion of a carbonaceous fuel can be carried out at a pressure of about 150 bar (15 MPa) to about 400 bar (40 MPa), and a pressure ratio between the combustion pressure and the pressure of the turbine exhaust stream can be in the range of about 5 to about 12 or about 5 to about 10. The combustor wherein the fuel is combusted in the presence of oxygen (preferably essentially pure oxygen) can be quenched by the large recycle high pressure working fluid flow, and the stream entering the turbine can be a mixed flow of combustion products and recycle $CO_2$ at a temperature of about 400° C. to about 1800° C., about 600° C. to about 1700° C., or about 800° C. to about 1600° C. Such system and method can provide surprising efficiency arising from a significant amount of heat input to the high pressure recycle $CO_2$ stream, particularly in the temperature range of about 100° C. to about 400° C. This external heat can be provided, for example, from the heat content of adiabatically compressed air feed to a cryogenic oxygen plant. The system thus can produce a $CO_2$ net product derived from the fuel at pipeline pressure—e.g., about 200 bar (20 MPa) to about 400 bar (40 MPa). As an exemplary embodiment, the use of a natural gas fuel to produce a combustion product stream with a turbine inlet temperature of about 1100° C. to about 1200° C. can provide a net efficiency on a lower heating value (LHV) basis in the range of about 55% to about 60%.

This can be increased even further according to the present disclosure through integration with the LNG re-gasification system. It should be noted that the integration of an LNG vaporization and natural gas pipeline delivery system with a power generation system can apply to a variety of power generation systems, particularly those incorporating a Brayton cycle using an economizer heat exchanger in which a compressor is used to pressurize a recycle of the working fluid that is then reheated in the economizer heat exchanger. In the various embodiments, the working fluid can be, for example, a $CO_2$ or $N_2$ rich gas.

An economized Brayton cycle using a power generation system as discussed above can require the compression of approximately 30 times the molar flow of a natural gas fuel for a typical plant having a turbine with an inlet condition of about 300 bar (30 MPa) and about 1150° C. and having an outlet pressure of about 30 bar (3 MPa). The compressor in this case has a suction temperature following water condensation and separation of about 20° C. The power required to compress the recycle $CO_2$ stream and the net $CO_2$ product stream to the range of 305 bar (30.5 MPa) is about 14.8% of the total turbine power output. The $CO_2$ compressor power requirement can be reduced by liquefying the $CO_2$ stream at a pressure of about 29 bar (2.9 MPa) and cooling the liquid $CO_2$ to within about 10° C. of its solidification temperature as this can maximize the density of the $CO_2$ stream. After the pressurization and liquefaction, the liquid $CO_2$ stream can be pumped to a pressure of about 305 bar (30.5 MPa), and the high pressure $CO_2$ can be heated back to ambient temperature. This procedure can reduce the $CO_2$ compression power to about 5.3% of the total turbine power output. In such an exemplary embodiment, the net cycle efficiency on an LHV basis can be increased from about 58.8% to about 65.7%.

The refrigeration required to achieve such increased efficiency in the power generation system and method can be derived from any source that would be recognized as being useful in light of the present disclosure. In reference to FIG. 2, the required refrigeration can be supplied to the power generation system and method via heat exchange from the heating of the high pressure LNG stream 118 leaving the pump 101.

In an exemplary embodiment, a low pressure $CO_2$ stream from a power generation system can be dried, and the dried $CO_2$ stream then can be liquefied and sub-cooled (e.g., in a diffusion bonded stainless steel high pressure heat exchanger, such as a Heatric Heat Exchanger) against the LNG stream, which in turn receives heating. If needed, in order to prevent freezing of the $CO_2$ and blocking of the heat exchanger passages, a fraction of the outlet natural gas stream 115 exiting the water bath vaporizer 102 at a temperature of about −20° C. to about 0° C. can be recycled and mixed with the cold compressed LNG stream 118 (which is at a temperature of about −160° C.) to produce a natural gas stream that is within about 10° C. above the freezing temperature of the $CO_2$ stream. A natural gas fuel stream entering a combustor in a power generation system as discussed above preferably is at a pressure noted above, for example, about 305 bar (30.5 MPa). If desired, the natural gas can be derived from the LNG supply, and the fuel natural gas stream can be provided using a second LNG pump taking its flow from line 118. The natural gas fuel stream can be heated to ambient temperature firstly (for example) against the cooling, liquefying, and sub-cooling $CO_2$ stream. Secondly, the natural gas fuel stream then can flow through a second heat exchanger to cool a closed cycle cooling water flow, which can be used in an oxygen plant air compressor inter and after-coolers. This use of a cryogenic LNG pump rather than a natural gas compressor can increase efficiency by a further 0.9% of the total turbine power. Using the natural gas to liquefy and sub-cool the $CO_2$ can impose a maximum temperature on the heated natural gas of about −10° C. because of the temperature pinch at the $CO_2$ freezing temperature—i.e., −56° C. The natural gas can be heated to about 15° C., which can be useful for delivery to a natural gas pipeline, by using it as a cooling stream against the turbine exhaust stream leaving the cold end of the economizer heat exchanger in the power generation system before liquid water separation. This can significantly reduce the residual water content in the gas phase which in turn reduces the size and cost of the desiccant drier which can be required to prevent water ice deposition in the $CO_2$ liquefier heat exchanger.

The integration of a power generation system as discussed above with an LNG vaporizing system preferably can include all necessary components to prevent interruptions in power generation as well as natural gas flow to the pipeline. For example, it can be beneficial for the LNG system to include an LNG heater system similar to that described in FIG. 2, preferably with the LNG heater 102 on and at or near operating temperature to provide for rapid switch-over to take up the LNG load being heated in integrated power generation system if the power generation system goes offline. This can prevent any significant fluctuations in pipeline supply pressure and maintain such pressure within the required tolerance. Similarly any failure of the pressurized LNG flow (such as, for example, a malfunction of pump 101) can be handled. For example, in the example of pump malfunction, LNG flow can be immediately switched to a parallel LNG pump which can be present in an LNG send-out facility. Preferably, such changeover can be carried out within about 5 to about 10 seconds to allow continuous operation of the power generation system.

Figure 3:
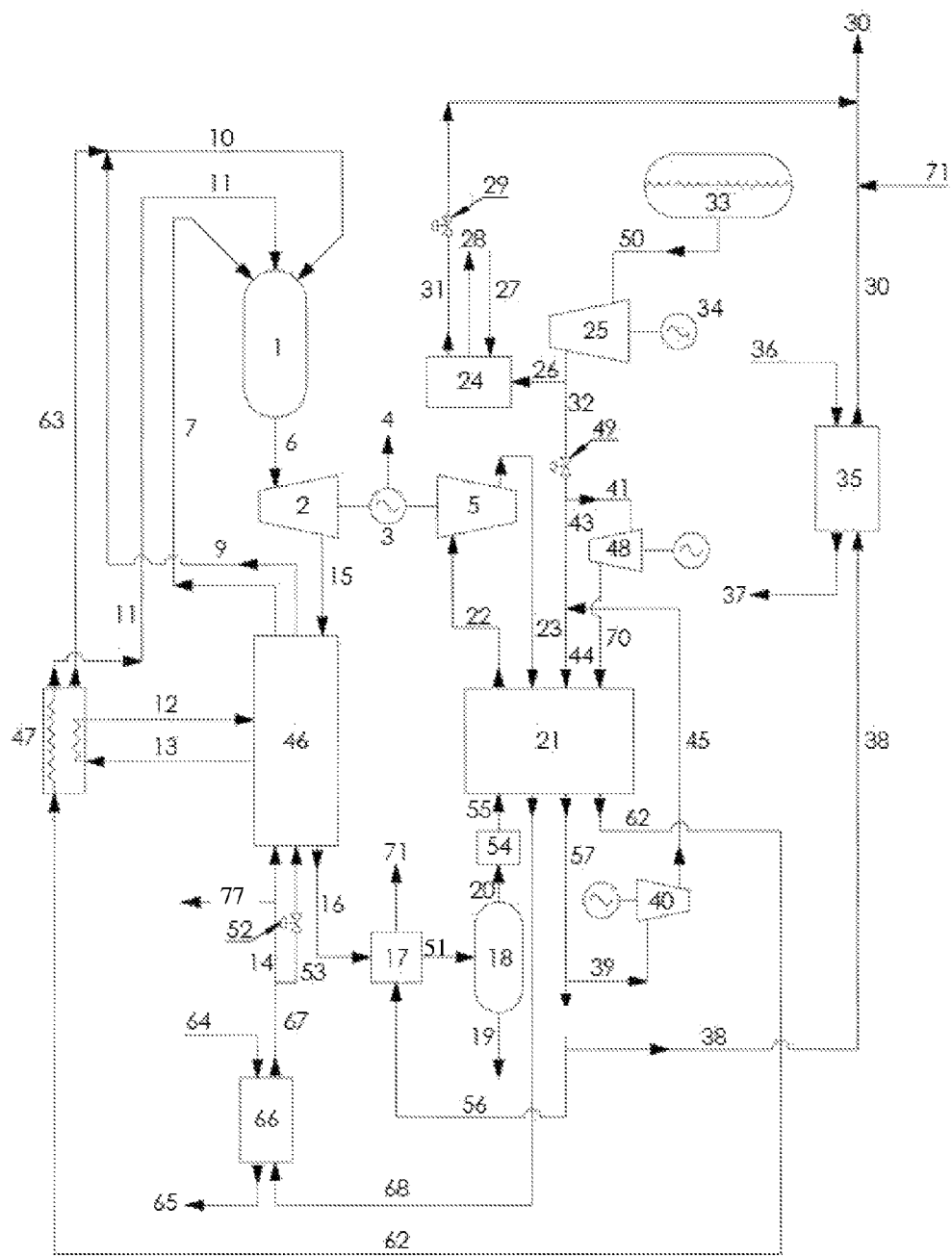
FIG. 3 is a flow diagram illustrating a system and method according to certain embodiments of the present disclosure wherein a power generating system and method is integrated with a LNG vaporization system and method.

An exemplary embodiment of a power generation system (using a pressurized natural gas fuel supply) integrated with a LNG vaporization and pressurized natural gas supply system is shown in FIG. 3. The discussion of FIG. 3 below illustrates the system and method in relation to a specific embodiment, and certain values and ranges should not be viewed as limiting. Rather, one of skill in the art reviewing the following in light of the present disclosure as a whole will recognize that various values can be changed based upon the specific operating conditions of the power generating system and the LNG vaporization system. The full scope of such ranges is intended to be encompassed by the following discussion, which is exemplary in nature and provided to meet all disclosure requirements.

The power generation system comprises a combustor 1 that combusts the natural gas fuel with oxygen in the presence of a recycled $CO_2$ working fluid to form a combustion product stream 6 that is rich in $CO_2$. In this example, the combustion product stream is at a pressure of about 300 bar (30 MPa) and a temperature of about 1150° C. The combustion product stream 6 enters a power turbine 2 driving a turbine electrical generator 3 producing an electrical output 4 together with additional shaft power that is used to drive a liquid $CO_2$ pump 5. A turbine discharge flow stream 15 at a temperature of about 788° C. and a pressure of about 30 bar (3 MPa) is cooled in an economizer heat exchanger 46 to provide an initially cooled turbine discharge flow stream 16 at a temperature of about 25° C. The initially cooled turbine discharge stream 16 is further cooled in a low temperature heat exchanger 17 and exits as the secondly cooled turbine discharge stream 51 at a temperature of about 4° C. This is achieved against a cooling natural gas stream 56, which is part of the total natural gas stream 57 leaving the $CO_2$ liquefier heat exchanger 21. The cooling natural gas stream 56 is heated in the low temperature heat exchanger 17 to provide a partial product natural gas stream 71 at a temperature of about 20° C., and this stream joins with the total product pipeline natural gas stream 30 leaving the LNG facility (e.g., at a temperature of about −10° C. or greater). The secondly cooled turbine discharge stream 51 passes into a liquid water separator 18, and a condensed water stream 19 is thereby removed from the secondly cooled turbine discharge stream 51. The separated $CO_2$ gas stream 20 is dried to a dew point of about −60° C. in a thermally regenerated desiccant drier 54. Other water removal systems, such as pressure swing adsorption (PSA) units also can be used. The dried $CO_2$ gas stream 55 is cooled to liquefaction, and the liquid $CO_2$ is sub-cooled to about −50° C. (e.g., −56° C. or greater) in the $CO_2$ liquefier heat exchanger 21 (e.g., a stainless steel diffusion bonded Heatric type heat exchanger), which simultaneously heats a pre-heated LNG product stream 44 at a pressure of about 68.9 bar (6.89 MPa) to a temperature of about −9.4° C. to form total natural gas stream 57. From the total natural gas stream 57 is divided an LNG heating natural gas fraction 39, which is compressed in an electrically driven blower 40. A thereby formed compressed LNG-heating natural gas stream 45 is mixed with the compressed LNG product stream 43, which is the major fraction of the compressed LNG, to form pre-heated LNG product stream 44, which enters the $CO_2$ liquefier heat exchanger 21 at a temperature that is above the $CO_2$ freezing temperature of −56° C. (e.g., to a temperature −55° C. or greater). This arrangement with dry $CO_2$ and heated LNG can be particularly useful to prevent freezing of the $CO_2$ to block or damage to the $CO_2$ liquefier heat exchanger 21.

In the present example, the LNG is stored at a pressure of about 0.08 bar (0.8 MPa) in LNG tank 33. A LNG tank discharge stream 50 is pumped to a pressure of about 70 bar (7 MPa) in LNG pump 25 driven by an electric motor 34. An LNG discharge stream 26 can pass through a water bath heater 24 to provide a bath heated natural gas stream 31 at a temperature of about 15° C. The water bath is heated by a bath fuel gas stream 27 that is burned in air in a draught tube burner with the combustion gases passing through the water and discharging through a bath stack 28. Flow of the compressed LNG stream 32 can be controlled as desired. For example, first control valve 29 and second control valve 49 can be used to determine the routing of the LNG. These, in combination with a variety of further pumps and water bath heaters in the LNG facility (not illustrated), can be used to alternate the flow path of the LNG stream to ensure continuous supply of LNG to the power generation system if the LNG pump 25 goes offline and continuous heating of all the compressed LNG to pipeline conditions if the power generation system goes offline. Such safety back-up provisions are described further herein.

In the present example, the natural gas used as the fuel in the combustor 1 of the power generation system can be drawn from the compressed LNG stream as LNG fuel fraction 41 and pumped to a pressure of about 306 bar (30.6 MPa) in an LNG fuel pump 48 (e.g., a multi-cylinder reciprocating electrically driven pump). A high pressure LNG fuel stream 70 is heated to about −10° C. in the $CO_2$ liquefier heat exchanger 21 and exits as high pressure natural gas fuel stream 62. Such heating is against the cooling, liquefying and sub-cooling $CO_2$. The high pressure natural gas fuel stream 62 is then heated in an air separation plant 47 to a temperature of about 230° C. against adiabatically compressed air using a closed cycle heat transfer fluid, which can be beneficial to prevent leaking of flammable gas into the air separation plant. The exiting, heated, high pressure natural gas stream 11 then proceeds to the combustor 1. The cryogenic air separation plant can include a first stage adiabatic main compressor with a discharge pressure of about 4 bar (0.4 MPa) and a booster compressor where about one third of the first stage compressed air is compressed in two adiabatic stages to about 100 bar (10 MPa). The bulk of the adiabatic heat of compression is transferred firstly to a high pressure recycle $CO_2$ side stream 13 taken from the high pressure $CO_2$ recycle stream being heated in the economizer heat exchanger 46. The high pressure recycle $CO_2$ side stream can be taken at a temperature of about 110° C. and returned as super-heated high pressure recycle $CO_2$ side stream 12 at a temperature of about 149° C. The adiabatic heat of compression of the two adiabatic stages is secondly used to heat the high pressure natural gas fuel stream 62 to a temperature of about 230° C. to form the heated high pressure natural gas fuel stream 63. The heat of compression is thirdly used to heat the oxygen product stream 11 at a pressure of about 305 bar (30.5 MPa) from the air separation plant to a temperature of about 230° C.

Leaving the cold end of the $CO_2$ liquefier heat exchanger 21 is a sub-cooled $CO_2$ recycle stream 22. This stream is compressed to about 306 bar (30.6 MPa) in the liquid $CO_2$ pump 5, which can be coupled through a gear box directly to the turbine electrical generator 3. Alternatively, a booster compressor (not illustrated) in the cryogenic air separation plant can be directly coupled to the turbine electrical generator 3. As a further alternative, main air compressor in the air separation plant can be directly coupled to the turbine electrical generator. It is preferably for the turbine to be directly loaded with a power demand from one of these alternatives so that in the event of an electrical disconnection from the electricity grid (e.g., arising from a generator trip), there is a load on the generator that will function as a brake since high pressure turbine feed gas will flow until system pressures equalize.

The pressurized sub-cooled $CO_2$ recycle stream 23 at a temperature of about −43° C. is then heated in the $CO_2$ liquefier heat exchanger 21 to a temperature of about 5.5° C. The high pressure recycle $CO_2$ stream 68 is heated to a temperature of about 25° C. in a supplemental $CO_2$ heat exchanger 66 to form a pre-heated high pressure recycle $CO_2$ stream 67. A heated, closed cycle heat transfer fluid stream 64 at a temperature of about 40° C. is cooled to a temperature of about 10° C. to exit as cooled heat transfer fluid stream 65. In a similar fashion, a total natural gas stream fraction 38 at a temperature of about −9.4° C. can be passed through a secondary natural gas heat exchanger 35 to be heated against a second heated, closed cycle heat transfer fluid stream 36 at about 40° C. A secondary cooled heat transfer fluid stream 37 exits at a temperature of about 10° C.

The pre-heated high pressure recycle $CO_2$ stream 67 leaving supplemental $CO_2$ heat exchanger 66 is divided into a first high pressure recycle $CO_2$ fraction 14 and a second high pressure recycle $CO_2$ fraction 53, which both pass through the economizer heat exchanger 46 and exit at a temperature of about 752° C. Recycle $CO_2$ fraction control valve 52 at the cold end of economizer heat exchanger 46 controls the flow ratio of the first $CO_2$ fraction 14 to the second $CO_2$ fraction 53. The heated, first $CO_2$ fraction stream 7 is delivered to the combustor 1 as the working fluid. The heated, second $CO_2$ fraction stream 9 mixes with the oxygen product stream 63 to give a 30% oxygen, 70% $CO_2$ molar ratio in the oxidant stream 10 entering the combustor 1, which moderates the adiabatic flame temperature to a value below about 3000° C. The net $CO_2$ product derived from the combusted fuel is available as a pipeline ready $CO_2$ product stream 77 at a pressure of about 305 bar (30.5 MPa) and a temperature of about 25° C.

Performance values based on a 250 MW net electrical output were calculated for the above exemplary integrated system using pure methane from the LNG source as the fuel for the combustor. Calculated values were as follows:

Natural gas burned in *NET* Power system =

$$380.4 \text{ MW} = 34.269 \text{ mmscfd}$$

Natural gas heated in *NET* Power system = 1095.9 mmscfd

Saving in natural gas for water bath heater = 16.986 mmscfd

Based on the foregoing, modeling was used to calculate efficiencies for a 1000 MW net electrical power generating system with an integrated LNG system as discussed above providing 1000 mmscfd natural gas flow rate at 68 bar (6.8 MPa) delivered to a pipeline at 15° C. Calculated overall efficiency was 68.06%. Calculated overall efficiency with a zero LNG flow rate to the 1000 MW power plant was 58.87%. In still a further embodiment modeled using Aspen Plus, a system and method according to the present disclosure used a methane fuel in the combustor, a turbine, a first heat exchanger (which was a series of three heat exchange units), a water separator, a second heat exchanger where $CO_2$ was liquefied against LNG to produce NG (with a side stream being used to pre-heat the LNG), a single pump to pressurize the recycle $CO_2$ stream, and recovered heat from an air separation plant to supplement heating of the recycle $CO_2$ stream. In the model of such embodiment, the overall efficiency of the integrated power generating and LNG vaporizing system and method was 65.7%. All of the above efficiency calculations encompass the complete capture of all excess $CO_2$ from combustion.

The benefit is further seen in relation to conventional LNG re-gasification systems wherein, typically, about 1.4% of the LNG that is processed is burned to provide heating, such as in the submerged burner described in relation to FIG. 2, for the remaining 98.6% of the processed LNG. This duty is imposed without any added benefit. According to the present disclosure, however, a 250 MWe power generating system, for example, can be integrated with a LNG re-gasification plant. In such example, the LNG plant can reheat approximately 10.8 B m³/year of LNG while burning approximately 3.1% to provide the heat. Because of the integration, although total gas sendout is reduced to 96.9% of the total amount processed, the increased duty fuels the generation of the electricity in the 250 MW power plant. Beneficially, such systems can be scaled as desired to increased or decreased capacity in relation to processed LNG and/or produced electricity.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

DESCRIPTION OF THE REFERENCE NUMERALS 1 combustor
2 power turbine
3 turbine electrical generator
4 electrical output
5 liquid $CO_2$ pump
6 combustion product stream
7 heated, first $CO_2$ fraction stream
9 heated second $CO_2$ fraction stream
10 oxidant stream
11 oxygen product stream
12 super-heated high pressure recycle $CO_2$ side stream
13 high pressure recycle $CO_2$ side stream
14 first high pressure recycle $CO_2$ fraction
15 turbine discharge flow stream
16 initially cooled turbine discharge flow stream
17 low temperature heat exchanger
18 liquid water separator
19 condensed water stream
20 separated $CO_2$ gas stream
21 $CO_2$ liquefier heat exchanger
22 sub-cooled $CO_2$ recycle stream
23 pressurized sub-cooled $CO_2$ recycle stream
24 water bath heater
25 LNG pump
26 LNG discharge stream
27 bath fuel gas stream
28 bath stack
29 first control valve
30 total product pipeline natural gas stream
31 bath heated natural gas stream
32 compressed LNG stream
33 LNG tank
34 electric motor
35 secondary natural gas heat exchanger
36 secondary heated, closed cycle heat transfer fluid
37 secondary cooled heat transfer fluid
38 total natural gas stream fraction
39 LNG-heating natural gas fraction
40 blower
41 LNG fuel fraction
43 compressed LNG product stream
44 pre-heated LNG product stream
45 compressed LNG-heating natural gas stream
46 economizer heat exchanger
47 air separation plant
48 LNG fuel pump
49 second control valve
50 LNG tank discharge stream
51 secondly cooled turbine discharge stream
52 recycle $CO_2$ control valve
53 second high pressure recycle $CO_2$ fraction
54 thermally regenerated desiccant drier
55 dried $CO_2$ gas stream
56 cooling natural gas stream
57 total natural gas stream
62 high pressure natural gas fuel stream
63 high pressure, heated natural gas stream
64 heated, closed cycle heat transfer fluid stream
65 cooled heat transfer fluid stream
66 supplemental $CO_2$ heat exchanger
67 pre-heated high pressure recycle $CO_2$ stream
68 high pressure recycle $CO_2$ stream
70 high pressure LNG fuel stream
71 partial product natural gas stream
77 $CO_2$ product stream
100 tank
101 pump
102 water bath vaporizer
103 filter 104 burner pressure blower
105 boil-off blower
106 boil-off compressor
107 atmospheric air line
109 air line
110 LNG tank boil-off line
111 boil-off compressor line
112 boil-off stream
113 NG burner fuel line
114 compressed boil-off NG stream
115 product natural gas stream
116 total natural gas pipeline flow stream
117 pressurized fuel gas stream
119 LNG supply line
120 burner
121 vent line
210a LNG supply
210b heated LNG supply
221 heat exchanger
239 supplement NG stream
240 blower
257 NG stream
258 product NG stream

The invention claimed is:

1. A method of generating power, the method comprising:
combusting a carbonaceous fuel in a combustor at a combustion pressure in the presence of oxygen and $CO_2$ to produce a combined combustion product stream at the combustion pressure;
expanding the combined combustion product stream in a turbine to generate power and form a turbine exhaust stream comprising $CO_2$, the turbine exhaust stream comprising $CO_2$ having a pressure that is less than the combustion pressure;
passing the turbine exhaust stream comprising $CO_2$ through a first heat exchanger so as to transfer heat from the turbine exhaust stream comprising $CO_2$ to a $CO_2$ recycle stream and form a cooled turbine exhaust stream comprising $CO_2$;
separating $CO_2$ from the cooled turbine exhaust stream comprising $CO_2$;
passing a liquefied natural gas (LNG) stream and the $CO_2$ separated from the cooled turbine exhaust stream comprising $CO_2$ through a second heat exchanger so as to cool and liquefy the $CO_2$ separated from the cooled turbine exhaust stream comprising $CO_2$ and so as to heat and vaporize the LNG stream to form a liquefied $CO_2$ stream and a gaseous natural gas (NG) stream, wherein the pressure of the $CO_2$ separated from the cooled turbine exhaust stream comprising $CO_2$ entering the second heat exchanger is less than the pressure of the turbine exhaust stream comprising $CO_2$ exiting the turbine;
passing both a fraction of the gaseous NG stream and the cooled turbine exhaust stream comprising $CO_2$ through a third heat exchanger, the cooled turbine exhaust stream comprising $CO_2$ passing through the third heat exchanger after passing through the first heat exchanger and prior to passing through the second heat exchanger;
pressurizing the liquefied $CO_2$ stream to form the $CO_2$ recycle stream; and
passing the $CO_2$ recycle stream to the combustor.

2. The method of claim 1, wherein the $CO_2$ recycle stream is passed to the combustor at a pressure of about 150 bar (15 MPa) to about 400 bar (40 MPa).

3. The method of claim 1, wherein the combusting is carried out at a temperature of about 500° C. to about 1600° C.

4. The method of claim 1, wherein a ratio of the combustion pressure to the pressure of the turbine exhaust stream comprising $CO_2$ is about 4 to about 12.

5. The method claim 1, wherein the LNG stream passed into the second heat exchanger is at a pressure of about 50 bar (5 MPa) to about 90 bar (9 MPa).

6. The method of claim 1, wherein a second fraction of the gaseous NG stream formed by the second heat exchanger is withdrawn and input to the LNG stream passed into the second heat exchanger.

7. The method of claim 6, wherein the second fraction of the gaseous NG stream input to the LNG stream is sufficient to raise a temperature of the LNG stream to above the $CO_2$ solidification temperature and within about 20° C. of the $CO_2$ solidification temperature.

8. The method of claim 1, wherein the $CO_2$ separated from the cooled turbine exhaust stream comprising $CO_2$ is cooled in the second heat exchanger to a temperature that is above the $CO_2$ solidification temperature and is within about 30° C. of the $CO_2$ solidification temperature.

9. The method of claim 1, wherein pressurizing the liquefied $CO_2$ stream to form the $CO_2$ recycle stream comprises passing the liquefied $CO_2$ stream through a liquid pump.

10. The method of claim 9, wherein the turbine produces shaft power, and wherein the shaft power is used to drive the liquid pump.

11. The method of claim 9, wherein the $CO_2$ recycle stream exiting the liquid pump is heated.

12. The method of claim 11, wherein the heating comprises passing the $CO_2$ recycle stream through the second heat exchanger.

13. The method of claim 1, wherein the carbonaceous fuel combusted in the combustor comprises at least a portion of the gaseous NG stream.

14. The method of claim 13, wherein the LNG stream is passed through a first pump, and a portion of the LNG stream is passed through a second pump after passing through the first pump and is then heated by passing through the second heat exchanger.

15. The method of claim 14, wherein a second gaseous NG stream formed by passing the portion of the LNG stream through the second heat exchanger is further heated utilizing heat of compression from an air separation plant.

16. The method of claim 1, wherein the passing through the third heat exchanger further cools the cooled turbine exhaust stream comprising $CO_2$ to a temperature of about 0° C. to about 10° C.

17. The method of claim 16, wherein the cooled turbine exhaust stream comprising $CO_2$ passing through the third heat exchanger is cooled against the fraction of the gaseous NG stream.

18. The method of claim 16, further comprising passing the cooled turbine exhaust stream comprising $CO_2$ through one or both of a liquid water separator and a desiccant drier so as to provide the $CO_2$ separated from the cooled turbine exhaust stream comprising $CO_2$ as a dried $CO_2$ stream.

19. The method of claim 1, wherein a portion of the $CO_2$ recycle stream passing to the combustor is heated utilizing heat of compression from an air separation plant.

20. The method of claim 1, wherein the $CO_2$ recycle stream passing to the combustor is separated into a first fraction and a second fraction.

21. The method of claim 20, wherein the first fraction of the $CO_2$ recycle stream passing to the combustor is input directly to the combustor.

22. The method of claim 20, wherein the second fraction of the $CO_2$ recycle stream passing to the combustor is combined with the oxygen to form an oxidant stream that is input to the combustor.

* * * * *